(12) United States Patent
Bouvier et al.

(10) Patent No.: US 7,762,067 B2
(45) Date of Patent: Jul. 27, 2010

(54) TURBOCHARGER WITH SLIDING PISTON ASSEMBLY

(75) Inventors: Emmanuel Bouvier, Epinal (FR); Lorrain Sausse, Charmes (FR); Quentin Roberts, Nancy (FR); Pierre Barthelet, Remiremont (FR)

(73) Assignee: Honeywell International, Inc., Morristown, NJ (US)

( * ) Notice: Subject to any disclaimer, the term of this patent is extended or adjusted under 35 U.S.C. 154(b) by 423 days.

(21) Appl. No.: 11/842,310

(22) Filed: Aug. 21, 2007

(65) Prior Publication Data

US 2009/0049834 A1  Feb. 26, 2009

(51) Int. Cl.
*F02D 23/00* (2006.01)
*F01D 17/14* (2006.01)
*F01D 17/16* (2006.01)
*F01D 17/10* (2006.01)
*F02C 6/12* (2006.01)

(52) U.S. Cl. .......................... 60/602; 415/157; 415/158; 415/148

(58) Field of Classification Search .................. 60/602; 415/157–159; F01D 17/14, 17/16; F02C 6/12
See application file for complete search history.

(56) References Cited

U.S. PATENT DOCUMENTS

| 2,957,424 | A | * | 10/1960 | Brundage et al. | ............ | 415/158 |
| 3,032,259 | A | * | 5/1962 | Jassniker | ............... | 415/148 |
| 3,784,318 | A | * | 1/1974 | Davis | .................. | 415/158 |
| 4,802,817 | A | * | 2/1989 | Tyler | .................... | 415/157 |
| 5,441,383 | A | * | 8/1995 | Dale et al. | ................ | 415/158 |
| 6,694,733 | B1 | * | 2/2004 | Bernardini et al. | ........... | 60/602 |
| 6,715,288 | B1 | * | 4/2004 | Engels et al. | ................ | 60/602 |
| 6,928,816 | B2 | * | 8/2005 | Leavesley | .................... | 60/602 |
| 7,010,918 | B2 | * | 3/2006 | Ruess | ........................... | 60/602 |
| 7,024,855 | B2 | * | 4/2006 | Perrin et al. | ................... | 60/602 |
| 7,497,654 | B2 | * | 3/2009 | Lavez et al. | ................ | 415/157 |
| 7,581,394 | B2 | * | 9/2009 | Perrin et al. | ................... | 60/602 |

FOREIGN PATENT DOCUMENTS

| DE | 4204019 | A1 | * | 5/1993 |
| DE | 4303521 | C1 | * | 1/1994 |
| DE | 4303520 | C1 | * | 9/1994 |
| DE | 10029807 | C1 | * | 3/2002 |
| WO | WO 2004025088 | A1 | * | 3/2004 |
| WO | WO 2007058647 | A1 | * | 5/2007 |
| WO | WO 2007058648 | A1 | * | 5/2007 |

* cited by examiner

*Primary Examiner*—Thai Ba Trieu
(74) *Attorney, Agent, or Firm*—Alston & Bird LLP

(57) ABSTRACT

A turbocharger having a turbine housing defining a chamber for receiving exhaust gas, and a nozzle leading from the chamber. Exhaust gas flows from the nozzle through a turbine wheel in the chamber and changes direction from a radially inward direction in the nozzle to an axial direction downstream of the turbine wheel. A divider in the nozzle divides the nozzle into first-stage and second-stage nozzles. The divider has an upstream surface to guide exhaust gas through the first-stage nozzle and an opposite downstream surface to guide exhaust gas flowing through the second-stage nozzle. An axially slidable tubular piston, disposed in the turbine housing, has a radially inner surface extending along the axial direction and a non-flat upstream end surface. The piston also includes a curved flow-guiding surface causing the exhaust gas to change direction. In a closed position, the piston abuts the divider to close the second-stage nozzle.

27 Claims, 6 Drawing Sheets

TURBOCHARGER WITH SLIDING PISTON ASSEMBLY

TECHNICAL FIELD

The present invention generally relates to turbochargers with sliding piston technology. More particularly, the present invention relates to such turbochargers having a divided turbine nozzle that forms separate first-stage and second-stage nozzles for aiding in regulating the flow of exhaust gas through the turbocharger.

BACKGROUND OF THE DISCLOSURE

Regulation of the exhaust gas flow through the turbine of an exhaust gas-driven turbocharger provides known operational advantages in terms of improved ability to control the amount of boost delivered by the turbocharger to the associated internal combustion engine. The regulation of exhaust gas flow is accomplished by incorporating variable geometry into the nozzle that leads into the turbine wheel. By varying the size of the nozzle flow area, the flow into the turbine wheel can be regulated, thereby regulating the overall boost provided by the turbocharger's compressor.

Variable-geometry nozzles for turbochargers generally fall into two main categories: variable-vane nozzles, and sliding-piston nozzles. Vanes are often included in the turbine nozzle for directing the exhaust gas into the turbine in an advantageous direction. Typically a row of circumferentially spaced vanes extend axially across the nozzle. Exhaust gas from a chamber surrounding the turbine wheel flows generally radially inwardly through passages between the vanes, and the vanes turn the flow to direct the flow in a desired direction into the turbine wheel. In a variable-vane nozzle, the vanes are rotatable about their axes to vary the angle at which the vanes are set, thereby varying the flow area of the passages between the vanes.

In the sliding-piston type of nozzle, the nozzle may also include vanes, but the vanes are fixed in position. Variation of the nozzle flow area is accomplished by an axially sliding piston that slides in a bore in the turbine housing. The piston is tubular and is located just radially inwardly of the nozzle. Axial movement of the piston is effective to vary the axial extent of the nozzle opening leading into the turbine wheel.

One type of a sliding-piston includes a divider that divides the nozzle into separate first-stage and second-stage nozzles. When the piston is in the closed position, the piston is adjacent to the radially inner (i.e., trailing) edge of the divider, thereby effectively closing the second-stage nozzle and causing the exhaust gas to flow to the turbine wheel area via the first stage-nozzle only. When the piston is in an open position, the gas can flow through both the first-stage and second-stage nozzles.

The sliding-piston type of variable nozzle offers the advantage of being mechanically simpler than the variable-vane nozzle. Nevertheless, other drawbacks have generally been associated with sliding-piston type variable nozzles. For example, the divider must be machined to precise dimensional tolerances to ensure proper sealing between the piston and the divider along a contact surface. The divider is relatively large, and thus a significant amount of precision machining must be performed. Further, even with precision machining, the contact surface between the piston and the divider still typically permits leakage of exhaust gas between the two members.

Additionally, when the piston is in the open position, the shape of the upstream and downstream portions of the divider do not direct the flow of exhaust gas to the turbine wheel in an advantageous direction. As a result of these drawbacks, turbine performance is reduced.

BRIEF SUMMARY OF THE DISCLOSURE

The present disclosure is directed to a turbine assembly for a turbocharger, comprising a turbine housing defining a bore extending along a downstream axial direction, a chamber surrounding the bore for receiving exhaust gas, and a nozzle leading from the chamber generally radially inwardly into the bore. A turbine wheel is rotatably mounted in the bore and comprises a hub and a plurality of turbine blades, extending generally radially outwardly from the hub, and terminating in blade tips. The hub and the bore of the turbine housing are configured such that exhaust gas flowing from the nozzle to and through the turbine wheel undergoes a change in direction from a generally radially inward direction in the nozzle to the downstream axial direction downstream of the turbine wheel.

A generally ring-shaped divider in the nozzle divides the nozzle into a first-stage nozzle and a second-stage nozzle. The first-stage nozzle is delimited between a fixed member of the turbine assembly and the divider. The divider has an upstream surface to guide exhaust gas flowing through the first-stage nozzle and an opposite downstream surface to guide exhaust gas flowing through the second-stage nozzle.

A tubular piston is disposed in the bore of the turbine housing and is axially slidable therein. The piston has a radially inner surface extending along the axial direction and has a non-flat upstream end surface, with a first radius, that includes a contact region for contacting a portion of the divider with the piston in a closed position. In the closed position, the second-stage nozzle is substantially closed and movement of the piston in the downstream axial direction acts to open the second-stage nozzle. The piston also includes a curved flow-guiding surface with a second radius proceeding from the contact region to the inner surface, the flow-guiding surface turning from a generally radially inward direction to the downstream axial direction to assist in causing the exhaust gas to execute a change in direction.

Another aspect of the present disclosure is directed to a method for regulating gas flow to a turbocharger by providing a turbine housing defining a bore extending along a downstream axial direction, a chamber surrounding the bore for receiving exhaust gas, and a nozzle leading from the chamber generally radially inwardly into the bore.

A generally ring-shaped divider is provided in the nozzle and divides the nozzle into first-stage and second-stage nozzles. The first-stage nozzle is delimited between a fixed member of the turbine assembly and the divider. The divider has an upstream surface to guide exhaust gas flowing through the first-stage nozzle and an opposite downstream surface to guide exhaust gas flowing through the second-stage nozzle.

A tubular piston is also provided and disposed in the bore of the turbine housing to be axially slidable therein. The piston has a radially inner surface extending along the axial direction and has a non-flat upstream end surface, with a first radius, that includes a contact region for contacting a portion of the divider with the piston in a closed position. In the closed position, the second-stage nozzle is substantially closed and movement of the piston in the downstream axial direction acts to open the second-stage nozzle. The piston is also configured to include a curved flow-guiding surface with a second radius proceeding from the contact region to the inner surface, the flow-guiding surface turning from a generally radially inward direction to the downstream axial direction to assist in causing the exhaust gas to execute a change in direction.

In yet another aspect of the disclosure, a system for a turbocharger comprises a turbine housing defining a bore extending along a downstream axial direction, a chamber surrounding the bore for receiving exhaust gas, and a nozzle leading from the chamber generally radially inwardly into the bore. A turbine wheel is rotatably mounted in the bore and comprises a hub and a plurality of turbine blades, extending generally radially outwardly from the hub, and terminating in blade tips. The hub and the bore of the turbine housing are configured such that exhaust gas flowing from the nozzle to and through the turbine wheel undergoes a change in direction from a generally radially inward direction in the nozzle to the downstream axial direction downstream of the turbine wheel.

A generally ring-shaped divider in the nozzle divides the nozzle into a first-stage nozzle and a second-stage nozzle. The first-stage nozzle is delimited between a fixed member of the turbine assembly and the divider. The divider has an upstream surface to guide exhaust gas flowing through the first-stage nozzle and an opposite downstream surface to guide exhaust gas flowing through the second-stage nozzle.

A tubular piston is disposed in the bore of the turbine housing and is axially slidable therein. The piston has a radially inner surface extending along the axial direction and has a non-flat upstream end surface, with a first radius, that includes a contact region for contacting a portion of the divider with the piston in a closed position. In the closed position, the second-stage nozzle is substantially closed and movement of the piston in the downstream axial direction acts to open the second-stage nozzle. The piston also includes a curved flow-guiding surface with a second radius proceeding from the contact region to the inner surface, the flow-guiding surface turning from a generally radially inward direction to the downstream axial direction to assist in causing the exhaust gas to execute a change in direction.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

Figure 1:
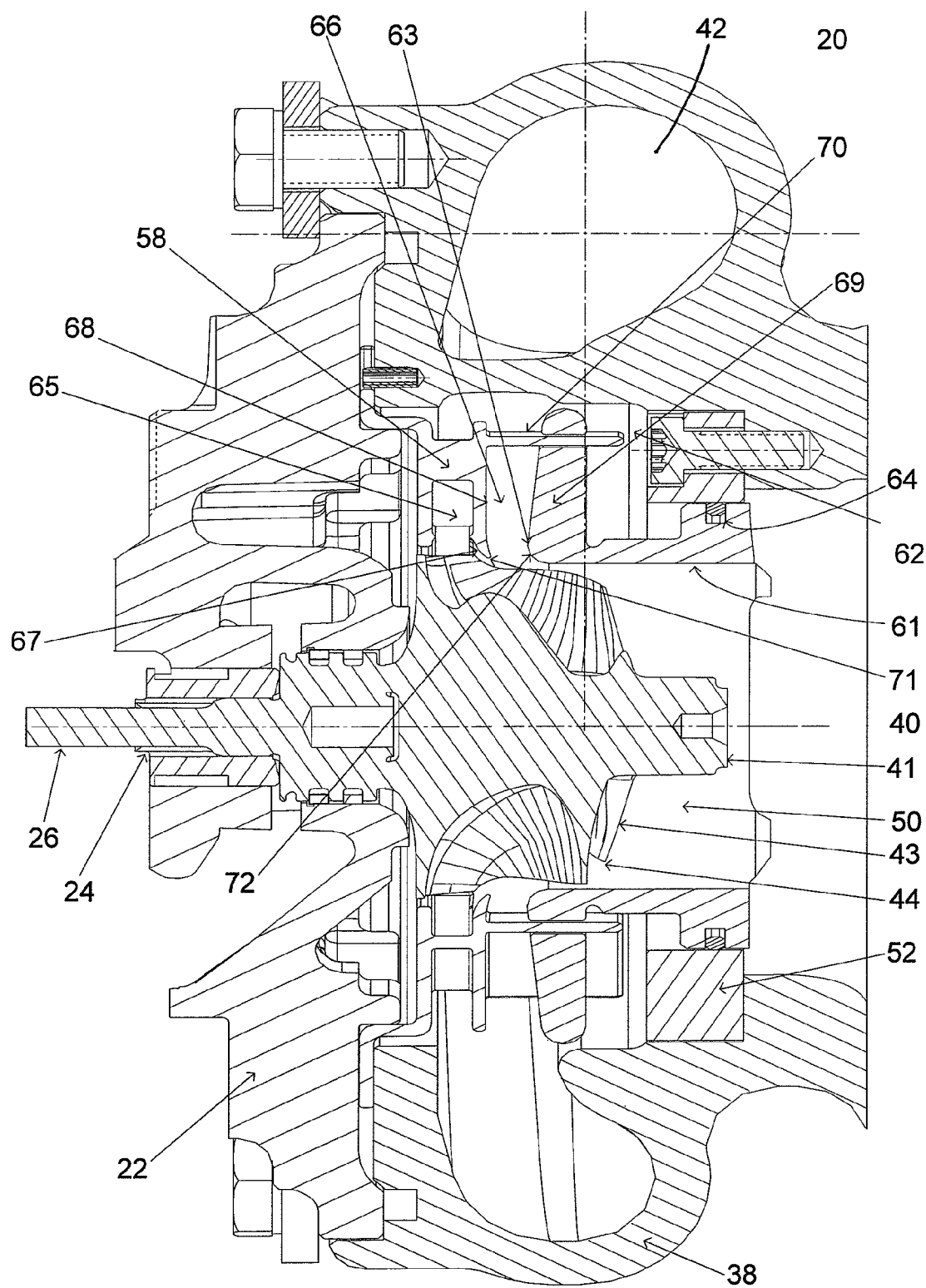
Figure 2A:
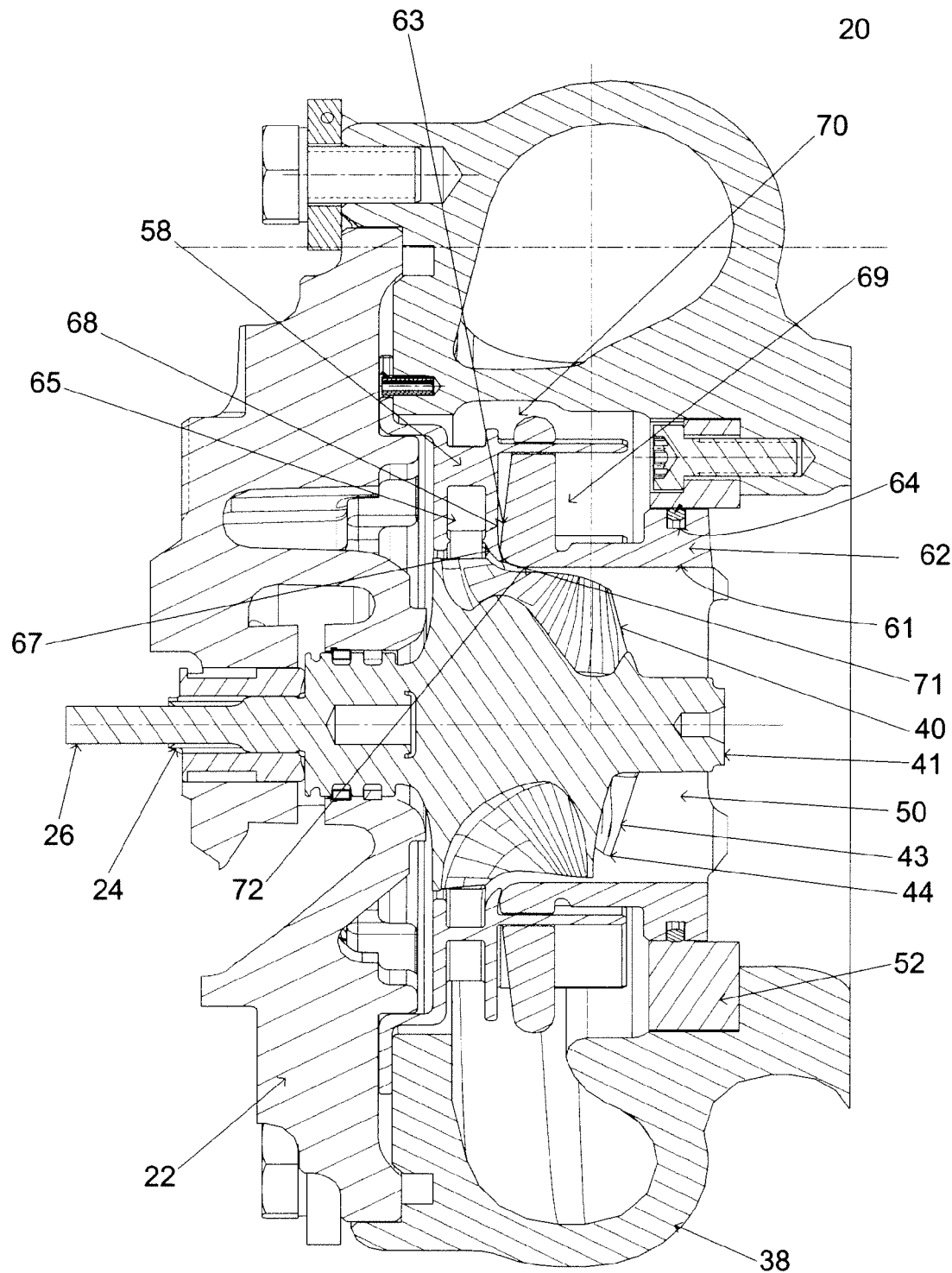
Figure 2B:
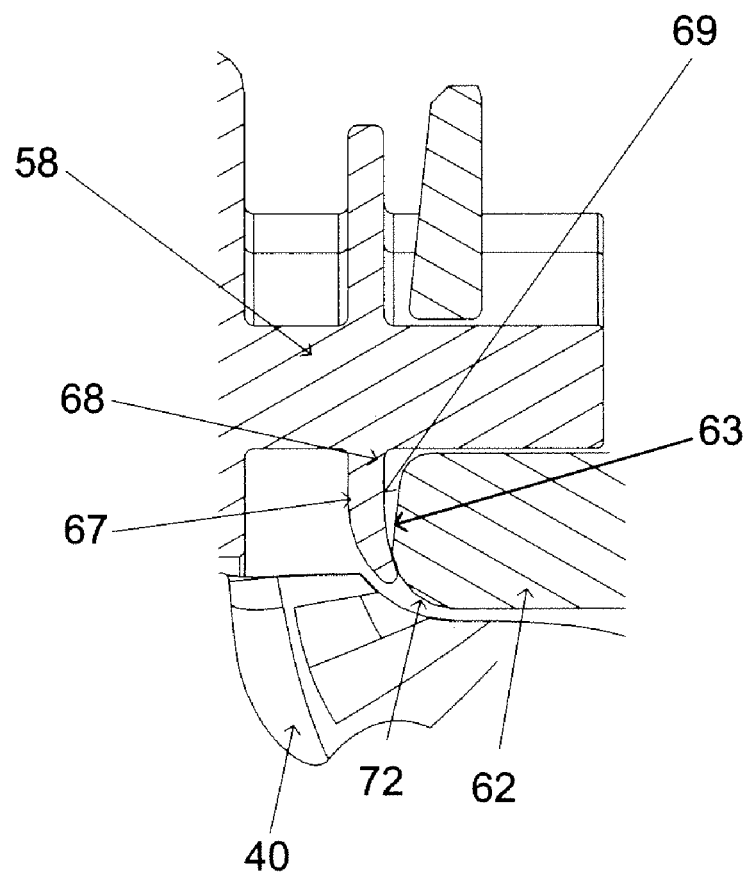

Having thus described the invention in general terms, reference will now be made to the accompanying drawings, which are not necessarily drawn to scale, and wherein:

FIG. 1 is a cross-sectional view of a turbocharger in accordance with one embodiment of the invention, showing the piston in an open position;

FIG. 2a is a view similar to FIG. 1, with the piston in a closed position;

FIG. 2b is an enlarged view of the divider and a portion of the piston assembly of FIG. 2a.

Figure 3:
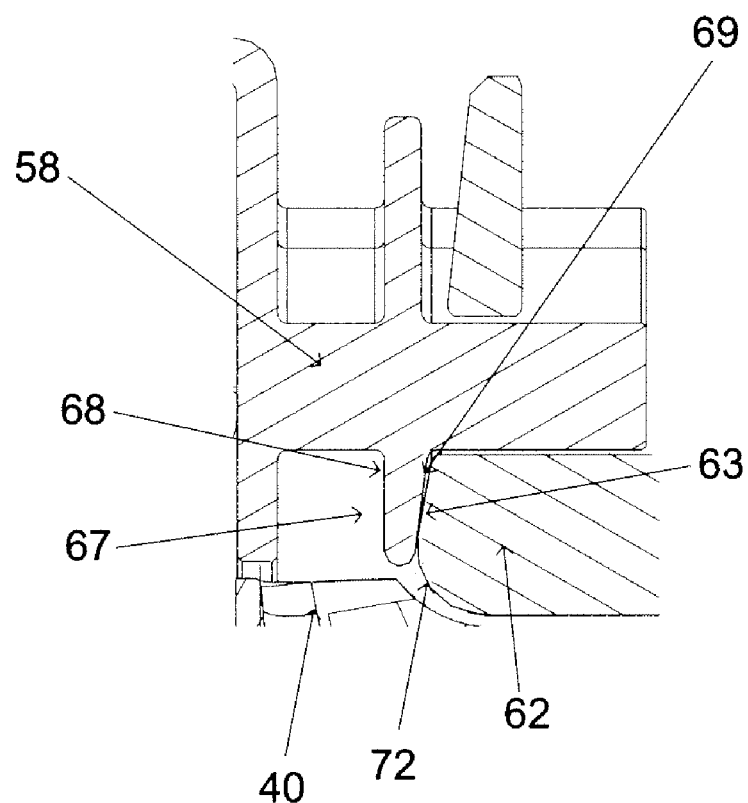

FIG. 3 is an enlarged view of the divider and a portion of the piston assembly illustrating a second embodiment of the second-stage nozzle.

Figure 4:
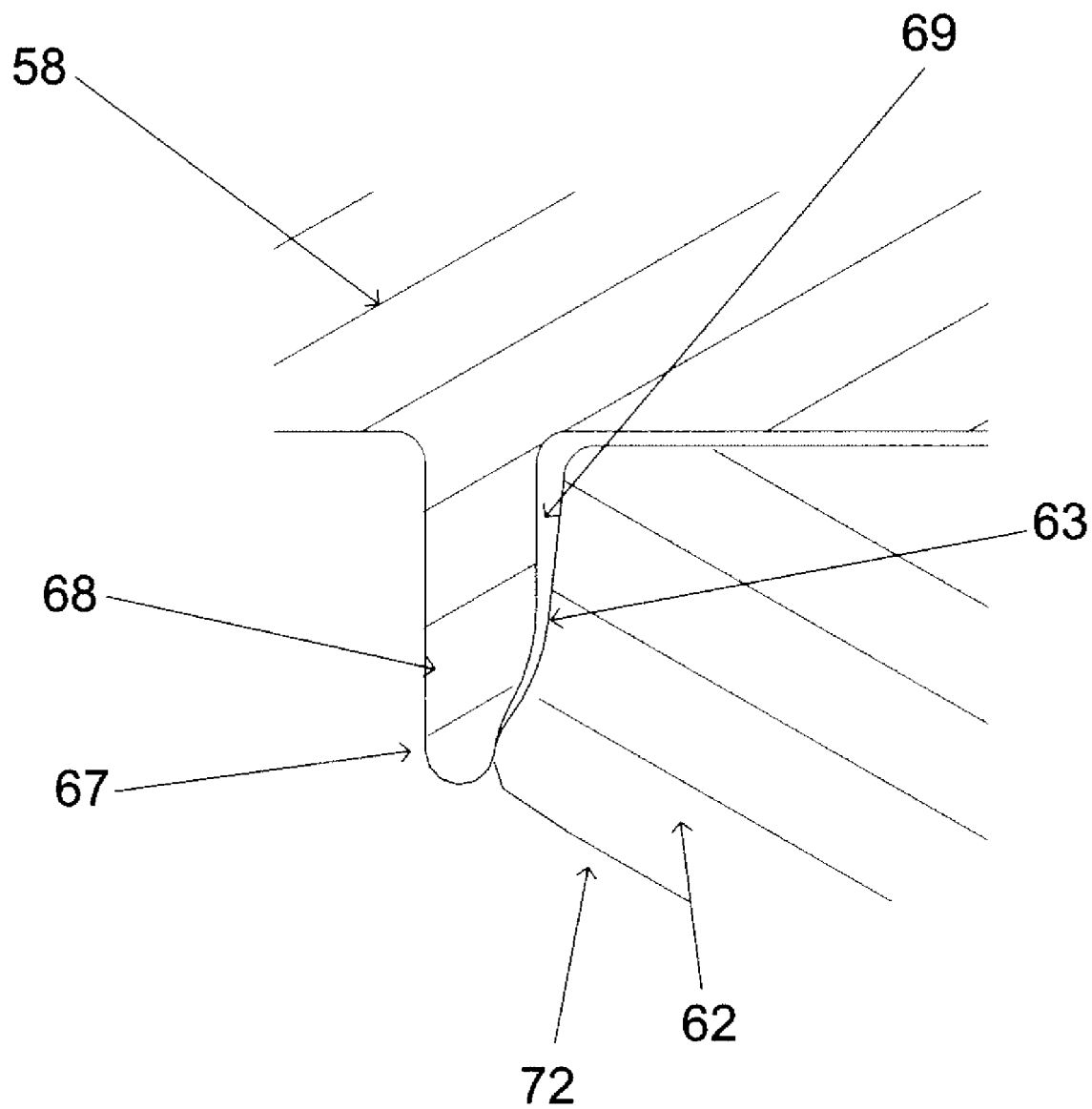

FIG. 4 is an enlarged view of the divider and a portion of the piston assembly illustrating a third embodiment of the second-stage nozzle.

Figure 5:
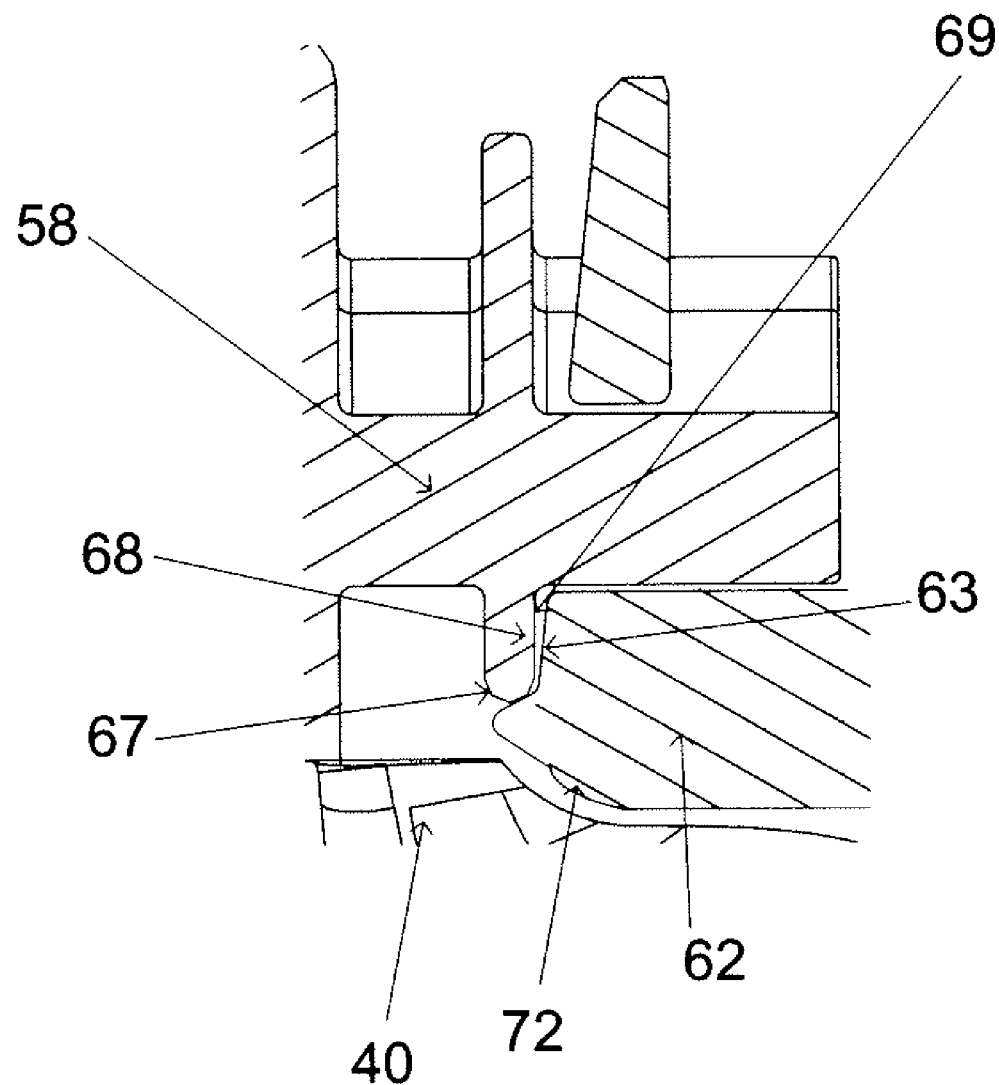

FIG. 5 is an enlarged view of the divider and a portion of the piston assembly illustrating a fourth embodiment of the second-stage nozzle.

DETAILED DESCRIPTION OF THE DRAWINGS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A turbocharger 20 in accordance with the invention is shown in FIGS. 1 through 5. The turbocharger includes a center housing 22 that contains a rotary shaft 26 of the turbocharger 20. A compressor housing (not shown) is coupled to one side of the center housing. A compressor wheel is mounted on one end of the shaft 26 and is disposed in the compressor housing. Although not illustrated, it will be understood that the compressor housing defines an inlet through which air is drawn into the compressor wheel, which compresses the air, and further defines a diffuser through which the compressed air is discharged from the compressor wheel into a volute surrounding the compressor wheel. From the volute, the air is delivered to the intake of an internal combustion engine (not shown). The turbocharger further comprises a turbine housing 38 coupled to the opposite side of the center housing 22. A turbine wheel 40 is mounted on the opposite end of the shaft 26 from the compressor wheel and is disposed in the turbine housing 38. The turbine housing 38 defines a chamber 42 that surrounds the turbine wheel 40 and receives exhaust gas from the internal combustion engine. Exhaust gas is directed from the chamber 42 through a first-stage nozzle 65 and optionally second-stage nozzle 70 (FIGS. 1-5) into the turbine wheel 40, which expands the exhaust gas and is driven thereby so as to drive the compressor wheel.

The turbine housing 38 defines a generally cylindrical axial bore 50 whose diameter generally corresponds to a radially innermost extent of the chamber 42. The turbine wheel 40 resides in an upstream end of the bore 50 and includes a hub 41. The rotational axis for both the turbine wheel 40 and the hub 41 is substantially coaxial with the bore 50. The term "upstream" in this context refers to the direction of exhaust gas flow through the bore 50, as the exhaust gas in the chamber 42 flows into the turbine wheel 40 and is then turned to flow generally axially (left to right in FIG. 1) through the bore 50 to its downstream end.

The turbine wheel 40 comprises a number of turbine blades 43 joined to the hub 41 and extending in a generally radial direction from the axis of the turbine wheel 40. The turbine blades 43 terminate at a radially outermost point to form turbine blade tips 44.

The turbocharger 20 includes a tubular piston 62 that resides in the bore 50 of the turbine housing 38. Surrounding tubular piston 62 is a seal ring 64 that contacts an inner surface of a tubular carrier 52 mounted in the bore 50 to prevent the escape of exhaust gases between the tubular piston 62 and carrier 52. The outer diameter of tubular piston 62 is slightly smaller than the inner diameter of the carrier 52 such that the piston 62 can be slid axially back and forth relative to the fixed carrier 52.

The piston 62 is axially slidable between an open position as shown in FIG. 1 wherein the piston 62 is spaced from a divider 68, a closed position as shown in FIG. 2 wherein the piston 62 abuts a downstream surface 69 of the divider 68, and various partially open positions therebetween. In the closed position (FIG. 2), the size of the total nozzle area through which exhaust gas flows from the chamber 42 to the turbine wheel 40 is at a minimum and the exhaust gas is constrained to flow through the row of vanes 58 of the first-stage nozzle 65 and along a divider upstream surface 67. In the open position of the piston 62 (FIG. 1), the nozzle flow area is at a maximum and part of the gas flows through the vanes 58 of the first-stage nozzle 65 while additional flow passes through second-stage nozzle 70. The second-stage nozzle 70 can also include vanes 66, with openings between the vanes 66, defined in the upstream end of the piston 62.

While the piston 62 is in the open position, exhaust gas is able to flow through the openings between vanes 66 in the second-stage nozzle 70 (FIG. 1). The second-stage nozzle 70 is essentially defined in the upstream direction by divider 68 and in the downstream direction along the piston 62. The portions of the divider 68 within the second-stage nozzle 70 are the downstream surface 69 and radially innermost edge 71, whereas the portions of the piston 62 within the second-stage nozzle 70 are the non-flat upstream surface 63 and the flow guiding surface 72. Further, the downstream surface 69 is essentially complementary with the non-flat upstream surface 63 and the flow guiding surface 72 to direct the flow of the exhaust gas through the second-stage nozzle 70 in an optimal direction to engage the turbine blades 43 of the turbine wheel 40.

Further, the turbine blade tips 44 in a radial-axial projection form a contour that is near the second-stage nozzle 70 and is at least somewhat complementary to a curved flow-guiding surface 72 of the piston 62. The complementary shaping of the flow-guiding surface 72 assists in altering the direction of exhaust gas from a generally radially inward direction in the first-stage and second-stage nozzles 65/70 to an axial direction downstream of the turbine wheel 40 and parallel with a radially-inner surface 61 of the piston 62. Such a configuration aids in increasing the efficiency of the turbocharger 20.

To close the second-stage nozzle 70, the piston 62 is slid axially in an upstream direction such that the non-flat upstream surface 63 and the flow guiding surface 72 of the piston 62 abut against the downstream surface 69 of the divider 68 (FIGS. 2a-b). As the downstream surface 69 is essentially complementary with the non-flat upstream surface 63 and the flow guiding surface 72, an effective seal is formed. The seal formed between the surfaces of the divider 68 and the piston 62 effectively reduce or eliminate the flow of exhaust gas through the second-stage nozzle 70.

An effective seal can be formed between the divider 68 and the piston 62 to effectively close the second-stage nozzle through a variety of other surface shapes along the downstream surface 69 of the divider 68 and the non-flat upstream surface 63 of the piston 62. For example, non-flat upstream surface 63 of the piston 62 may retain the same shape as illustrated in FIGS. 2a-b while the downstream surface 69 of the divider may form a generally flat surface with a negative slope. In this configuration, downstream surface 69 gradually moves in the upstream direction as the divider 68 extends toward the axis of the bore 50 (FIG. 3).

Other embodiments of the piston 62 are also available to form an effective seal with the divider 68. For example, the non-flat-upstream surface 63 may include a boss. The boss itself can be formed along the non-flat-upstream surface 63 at a number of positions and the boss may have varying degrees of protrusion. FIG. 4 illustrates a non-flat-upstream surface 63 of the piston that includes a small boss. Where a small boss in present on the non-flat-upstream surface 63, the downstream surface 69 of the divider 68 may include a shape that is complementary to at least a portion of the boss (FIG. 4). Alternatively, FIG. 5 illustrates a non-flat-upstream surface 63 the piston 62 that includes a large boss. With a large boss present the radially innermost edge 71 of the divider 68 is positioned to abut a radially outer portion of the boss when the second-stage nozzle 70 is in the closed position (FIG. 5). With each of the alternative divider 68 and piston 62 designs, an effective seal is created between the divider 68 and piston 62 to minimize the amount of exhaust gas flowing through the second-state nozzle 70 in the closed position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for regulating exhaust gas flow to a turbocharger comprising:

providing a turbine housing defining a bore extending along a downstream axial direction and defining a chamber surrounding the bore for receiving exhaust gas, and a nozzle leading from the chamber generally radially inwardly into the bore;

providing a turbine wheel rotatably mounted in the bore and comprising a hub and a plurality of turbine blades extending generally radially outwardly from the hub and terminating in blade tips;

providing a generally ring-shaped divider in the nozzle that divides the nozzle into a first-stage nozzle and a second-stage nozzle, the first-stage nozzle being delimited between a fixed member of the turbine assembly and the divider, the divider having an upstream surface guiding exhaust gas flowing through the first-stage nozzle and an opposite downstream surface guiding exhaust gas flowing through the second-stage nozzle, the divider having a radially innermost edge, the first-stage nozzle and second-stage nozzle each receiving exhaust gas from the chamber and each directing the exhaust gas radially inwardly onto the blade tips of the turbine wheel;

providing a tubular piston disposed in the bore of the turbine housing and being axially slidable therein, the piston having a radially inner surface extending along the axial direction and having a non-flat upstream end surface, with a first radius, that includes a contact region for contacting a portion of the divider with the piston in a closed position so as to substantially close the second-stage nozzle, and movement of the piston in the downstream axial direction opening the second-stage nozzle; and configuring the piston to include a curved flow-guiding surface with a second radius proceeding from the contact region to the inner surface, the flow-guiding surface turning from a generally radially inward direction to the downstream axial direction so as to assist in causing the exhaust gas to execute said change in direction, wherein the blade tips define a contour, in a radial-axial projection, having a portion generally aligned with the second-stage nozzle that is concave in a radially outward direction, and the curved flow-guiding surface of the piston is generally complementary and parallel to said portion of the contour of the blade tips.

2. The method for producing a turbocharger of claim 1, wherein the upstream surface of the divider defines a convex surface generally projecting in an upstream direction of the bore.

3. The method for producing a turbocharger of claim 1, wherein the downstream surface of the divider defines a concave surface generally projecting in a downstream direction of the bore.

4. The method for producing a turbocharger of claim 1, wherein the radially innermost edge of the divider defines a convex surface generally projecting in a radial direction of the bore.

5. The method for producing a turbocharger of claim 1, wherein the non-flat upstream end surface of the piston defines a convex surface generally projecting in an upstream direction of the bore.

6. The method for producing a turbocharger of claim 1, wherein the curved flow-guiding surface of the piston defines a convex surface.

7. The method for producing a turbocharger of claim 1, wherein the upstream and downstream surfaces of the divider are configured to direct a flow of exhaust gas to the turbine wheel in an advantageous direction.

8. The method for producing a turbocharger of claim 1, wherein the downstream surface of the divider defines a concave surface generally projecting in a downstream direction of the bore,
wherein the non-flat upstream end surface of the piston defines a convex surface generally projecting in an upstream direction of the bore.

9. The method for producing a turbocharger of claim 1, wherein the downstream surface of the divider defines a concave surface generally projecting in an downstream direction of the bore,
wherein the radially innermost edge of the divider defines a convex surface generally projecting in a radial direction of the bore,
wherein the non-flat upstream end surface of the piston defines a convex surface generally projecting in an upstream direction of the bore, and
wherein the curved flow-guiding surface of the piston defines a convex surface.

10. A turbine assembly for a turbocharger, comprising:
a turbine housing defining a bore extending along a downstream axial direction and defining a chamber surrounding the bore for receiving exhaust gas, and a nozzle leading from the chamber generally radially inwardly into the bore;
a turbine wheel rotatably mounted in the bore and comprising a hub and a plurality of turbine blades extending generally radially outwardly from the hub and terminating in blade tips, the hub of the turbine wheel and the bore of the turbine housing being configured such that exhaust gas flowing from the nozzle to and through the turbine wheel undergoes a change in direction from a generally radially inward direction in the nozzle to the downstream axial direction downstream of the turbine wheel;
a generally ring-shaped divider in the nozzle dividing the nozzle into a first-stage nozzle and a second-stage nozzle, the first-stage nozzle being delimited between a fixed member of the turbine assembly and the divider, the divider having an upstream surface guiding exhaust gas flowing through the first-stage nozzle and an opposite downstream surface guiding exhaust gas flowing through the second-stage nozzle, the divider having a radially innermost edge;
the first-stage nozzle and second-stage nozzle each receiving exhaust gas from the chamber and each directing the exhaust gas radially inwardly onto the blade tips of the turbine wheel;
wherein the blade tips define a contour, in a radial-axial projection, having a portion generally aligned with the second-stage nozzle that is concave in a radially outward direction; and
a tubular piston disposed in the bore of the turbine housing and being axially slidable therein, the piston having a radially inner surface extending along the axial direction and having a non-flat upstream end surface, with a first radius, that includes a contact region for contacting a portion of the divider with the piston in a closed position so as to substantially close the second-stage nozzle, and movement of the piston in the downstream axial direction opening the second-stage nozzle,
wherein the piston includes a curved flow-guiding surface with a second radius proceeding from the contact region to the inner surface, the flow-guiding surface turning from a generally radially inward direction to the downstream axial direction so as to assist in causing the exhaust gas to execute said change in direction, and wherein the curved flow-guiding surface of the piston is generally complementary and parallel to said portion of the contour of the blade tips that is generally aligned with the second-stage nozzle.

11. The turbocharger of claim 10, wherein the upstream surface of the divider defines a convex surface generally projecting in an upstream direction of the bore.

12. The turbocharger of claim 10, wherein the downstream surface of the divider defines a concave surface generally projecting in a downstream direction of the bore.

13. The turbocharger of claim 10, wherein the radially innermost edge of the divider defines a convex surface generally projecting in a radial direction of the bore.

14. The turbocharger of claim 10, wherein the non-flat upstream end surface of the piston defines a convex surface generally projecting in an upstream direction of the bore.

15. The turbocharger of claim 10, wherein the curved flow-guiding surface of the piston defines a convex surface.

16. The turbocharger of claim 10, wherein the upstream and downstream surfaces of the divider are configured to direct a flow of exhaust gas to a turbine wheel in an advantageous direction.

17. The turbocharger of claim 10, wherein the downstream surface of the divider defines a concave surface generally projecting in a downstream direction of the bore,
wherein the non-flat upstream end surface of the piston defines a convex surface generally projecting in an upstream direction of the bore.

18. The turbocharger of claim 10, wherein the downstream surface of the divider defines a concave surface generally projecting in an downstream direction of the bore,
wherein the radially innermost edge of the divider defines a convex surface generally projecting in a radial direction of the bore,
wherein the non-flat upstream end surface of the piston defines a convex surface generally projecting in an upstream direction of the bore, and wherein the curved flow-guiding surface of the piston defines a convex surface.

19. A system for a turbocharger comprising:

a turbine housing defining a bore extending along a downstream axial direction and defining a chamber surrounding the bore for receiving exhaust gas, and a nozzle leading from the chamber generally radially inwardly into the bore;

a turbine wheel rotatably mounted in the bore and comprising a hub and a plurality of turbine blades extending generally radially outwardly from the hub and terminating in blade tips, the hub of the turbine wheel and the bore of the turbine housing being configured such that exhaust gas flowing from the nozzle to and through the turbine wheel undergoes a change in direction from a generally radially inward direction in the nozzle to the downstream axial direction downstream of the turbine wheel;

a generally ring-shaped divider in the nozzle dividing the nozzle into a first-stage nozzle and a second-stage nozzle, the first-stage nozzle being delimited between a fixed member of the turbine assembly and the divider, the divider having an upstream surface guiding exhaust gas flowing through the first-stage nozzle and an opposite downstream surface guiding exhaust gas flowing through the second-stage nozzle, the divider having a radially innermost edge;

the first-stage nozzle and second-stage nozzle each receiving exhaust gas from the chamber and each directing the exhaust gas radially inwardly onto the blade tips of the turbine wheel; and a tubular piston disposed in the bore of the turbine housing and being axially slidable therein, the piston having a radially inner surface extending along the axial direction and having a non-flat upstream end surface, with a first radius, that includes a contact region for contacting a portion of the divider with the piston in a closed position so as to substantially close the second-stage nozzle, and movement of the piston in the downstream axial direction opening the second-stage nozzle, wherein the piston includes a curved flow-guiding surface with a second radius proceeding from the contact region to the inner surface, the flow-guiding surface turning from a generally radially inward direction to the downstream axial direction so as to assist in causing the exhaust gas to execute said change in direction, wherein the blade tips define a contour, in a radial-axial projection, having a portion generally aligned with the second-stage nozzle that is concave in a radially outward direction, and the curved flow-guiding surface of the piston is generally complementary and parallel to said portion of the contour of the blade tips.

20. The system for a turbocharger of claim 19, wherein the upstream surface of the divider defines a convex surface generally projecting in an upstream direction of the bore.

21. The system for a turbocharger of claim 19, wherein the downstream surface of the divider defines a concave surface generally projecting in a downstream direction of the bore.

22. The system for a turbocharger of claim 19, wherein the radially innermost edge of the divider defines a convex surface generally projecting in a radial direction of the bore.

23. The system for a turbocharger of claim 19, wherein the non-flat upstream end surface of the piston defines a convex surface generally projecting in an upstream direction of the bore.

24. The system for a turbocharger of claim 19, wherein the curved flow-guiding surface of the piston defines a convex surface.

25. The system for a turbocharger of claim 19, wherein the upstream and downstream surfaces of the divider are configured to direct a flow of exhaust gas to a turbine wheel in an advantageous direction.

26. The system for a turbocharger of claim 19, wherein the downstream surface of the divider defines a concave surface generally projecting in a downstream direction of the bore,
wherein the non-flat upstream end surface of the piston defines a convex surface generally projecting in an upstream direction of the bore.

27. The system for a turbocharger of claim 19, wherein the downstream surface of the divider defines a concave surface generally projecting in an downstream direction of the bore,
wherein the radially innermost edge of the divider defines a convex surface generally projecting in a radial direction of the bore,
wherein the non-flat upstream end surface of the piston defines a convex surface generally projecting in an upstream direction of the bore, and
wherein the curved flow-guiding surface of the piston defines a convex surface.

* * * * *